United States Patent Office 3,396,129
Patented Aug. 6, 1968

3,396,129
INTUMESCING FIRE-RETARDANT COATING COMPOSITIONS AND METHOD FOR MAKING SAME
David A. Yeadon and Eric T. Rayner, New Orleans, Gerald B. Verburg, Metairie, and Lucien L. Hooper, Jr., Frank G. Dollear, and Harold P. Dupuy, New Orleans, La., assignors to the United States of America as represented by the Secretary of Agriculture
No Drawing. Continuation-in-part of application Ser. No. 253,004, Jan. 21, 1963. This application July 31, 1964, Ser. No. 386,797
39 Claims. (Cl. 260—22)

ABSTRACT OF THE DISCLOSURE

Processes are provided for the synthesis of (1) water-resistant carbonific polyurethanes, (2) water-resistant, nonhygroscopic spumific, fire-retardant polyaminotriazine phosphates, (3) water-resistant carbonific polycarbonates, and (4) water-resistant, intumescing, fire-retardant poly-(urea-urethane-phosphate-phosphonates), and the utilization of these products and/or mixtures thereof in paint formulations to obtain exterior and interior, intumescing, fire-retardant paints.

---

A nonexclusive, irrevocable, royalty-free license in the invention herein described, throughout the world for all purposes of the United States Government, with the power to grant sublicenses for such purposes, is hereby granted to the Government of the United States of America.

This invention is a continuation-in-part of patent application, Ser. No. 253,004, filed Jan. 21, 1963 now abandoned, and relates to the development of exterior and interior, intumescing, fire-retardant coating compositions and in particular to the methods employed and to the processes devised to synthesize the specific ingredients used to prepare these coating compositions.

An earlier application by Rayner, et al., Ser. No. 179,818, filed Mar. 14, 1962 now U.S. Patent No. 3,269,-989 issued Aug. 30, 1966, disclosed means for preparing intumescent coating compositions by incorporating up to about 6% of certain gas-producing ingredients which ingredients puff up or intumesce the coating layer when heated and thereby protect the coated surface. However, the presently described intumescing, fire-retardant coating compositions contain spumific (foam-forming) and carbonific (carbon-forming) components which when exposed to heat and flames are transformed into cellular carbonaceous structures that support the intumesced coating layer and thus provide highly effective fire-retardance and protection for the coated surface. Additionally, our gas-producing, fire-retardant coating compositions required a multiple-formulation paint system, whereas our present foam-forming, intumescing, fire-retardant coating compositions can be used with either a single-formulation or a multiple-formulation paint system, thus providing a more versatile coating as well as a coating that exhibits superior fire retardancy.

The intumescing, fire-retardant, surface coatings that are the ultimate products of this invention are weather resistant as well as fire retardant. In addition, these coatings can be applied to surfaces that are inherently flammable, such as paper, cardboard, wood, fibrous wallboard and the like, and to nonflammable surfaces, such as metal, plasterboard and the like.

A first object of this invention is to provide processes for the syntheses of water-resistant, carbonific polyurethanes by reacting water-soluble, carbonific or noncarbonific polyhydric alcohols with isocyanates.

A second object of this invention is to provide exterior and interior, intumescing, fire-retardant paint formulations with these water-resistant, carbonific polyurethanes.

A third object of this invention is to provide improved processes for the syntheses of water-resistant, nonhygroscopic spumific, fire-retardant polyaminotriazine phosphates by reacting polyaminotriazines with phosphorus-containing compounds such as phosphoric acid, phenylphosphonic acid, chloromethylphosphonic acid and butyl acid phosphates and mixtures thereof.

A fourth object of this invention is to provide exterior and interior, intumescing, fire-retardant paint formulations with these water-resistant, carbonific polyurethanes and water-resistant, nonhygroscopic spumific, fire-retardant polyaminotriazine phosphates.

A fifth object of this invention is to provide exterior and interior, intumescing, fire-retardant paint formulations with these water-resistant, carbonific polyurethanes and polyhaloalkyl phosphates.

A sixth object of this invention is to provide exterior and interior, intumescing, fire-retardant paint formulations with these water-resistant, carbonific polyurethanes, the water-resistant, nonhygroscopic spumific, fire-retardant polyaminotriazine phosphates and polyhaloalkyl phosphates.

A seventh object of this invention is to provide processes for the syntheses of water-resistant, carbonific polycarbonates by reacting water-soluble, carbonific polyhydric alcohols with chloroformates.

An eighth object of this invention is to develop exterior and interior, intumescing, fire-retardant paint formulations with these water-resistant, carbonific polycarbonates and water-resistant, nonhygroscopic spumific, fire-retardant polyaminotriazine phosphates.

A ninth object of this invention is to provide processes for the syntheses of water-resistant, intumescing, fire-retardant poly(urea-urethane-phosphate-phosphonates) by reacting water-soluble, carbonific, polyhydric alcohols and polyhydric alkyl phosphates or phosphonates or both with isocyanates.

A tenth object of this invention is to provide exterior and interior, intumescing, fire-retardant paint formulations with these water-resistant, intumescing, fire-retardant poly(urea-urethane-phosphate-phosphonates) and polyhaloalkyl phosphates.

The development of intumescing, fire-retardant coating compositions from polyhydric carbonifics (carbon-forming) and phosphorus spumifics (foam-forming) is well known, but these coatings lack desirable service properties, such as can stability (some of the components because of their reactive nature have to be stored in separate containers until used), brushability, water resistance, washability, weather resistance, carbonific and spumific action.

Water-soluble compounds, such as pentaerythritol, dipentaeryhritol, monoammonium phosphate, diammonium phosphate, ammonium sulfamate, ammonium bromide, sodium tungstate, sodium borate, urea phosphate, and the like, have been employed to formulate intumescing, fire-retardant, coating compositions, however, such coating compositions exhibit poor washability, water resistance, and weather resistance. When such coatings are subjected to severe leaching tests or to weather exposure, either their fire-retardant properties are drastically reduced or the coating is completely washed off, as is illustrated in Table II with Commercial–A, Commercial–B, and Commercial–C formulations.

Our invention is based upon the discovery among others that water-resistant carbonific polyurethanes can be prepared by reacting water-soluble carbonific or non-carbonific, polyhydric alcohols with isocyanates such as monoisocyanates and diisocyanates. In our process of rendering water-resistant these water-soluble polyhydric alcohols, such as pentaerythritol, dipentaerythritol, glycerol, xylitol, sorbitol, mannitol, tris(hydroxymethyl) aminomethane, tris(hydroxymethyl)ethane and polymethylolmelamine, the intumescing characteristics are actually enhanced. Thus, by this technique the excellent carbonific properties of the best polyhydric alcohol, pentaerythritol, when formulated into coatings, are actually enhanced while at the same time it is rendered water resistant. Formulations C and D in Table II illustrate this point. Also, we have found that the fire-retardant properties of the coatings are improved by incorporating about from 5% to 15% of a polyhaloalkyl phosphate or about from 3% to 15% of a polyaminotriazine phosphate or both as illustrated in Table II with Formulations A, B and C. Our invention includes the discovery that the production of intumescing, fire-retardant coating compositions depends upon synergistic activity among the intumescing, fire-retardant materials, the vehicles and the pigments. The removal of a single pigment from an intumescing, fire-retardant coating composition can reduce its fire-retardant properties as is illustrated in Table II with Formulation E. The simple incorporation of carbonific polyurethanes into nonfire-retardant coating compositions does not necessarily produce intumescing, fire-retardant coating compositions as illustrated in Table II with Commercial–D, Commercial–D–1, Commhercial–E, and Commercial–E–1 formulations. The proper type and concentration of vehicle, of pigments, and of intumescing, fire-retardant materials are important in the production of good exterior and interior, intumescing, fire-retardant coating compositions.

Our invention includes the discovery that fire-retardant coatings, which have a tendency to blister and rupture excessively when evaluated for their fire-retardant performance in tunnel furnaces such as Underwriters' Laboratories 25-foot tunnel furnace (ASTM E 84–61), can be improved by incorporating highly bodied oils such as air-blown tung oil (R. O. Austin, et al., Official Digest, 35, No. 460, 487–499 (May 1963)), or alkyl "b." In addition, coatings which produce adverse thermoplastic characteristics during their fire-retardant evaluation can be improved by formulating with less thermoplastic water-resistant carbonific pentaerythritol polyurethanes. These phenomena are illustrated very well in Table III.

Our invention also includes the discovery that water-resistant carbonific polyurethanes can be prepared from water-soluble polyhydric alcohols that are devoid of a neopentyl carbon atom; for example, polyhydric alcohols such as glycerol, xylitol, erythritol, sorbitol, mannitol, tris(hydroxymethyl)aminomethane, tris(hydroxymethyl) ethane and polymethylolmelamine.

Further, our invention includes the discovery that homogeneous, water-resistant carbonific polyurethanes can be prepared by reacting at room temperature to about 180° C., in the presence of catalytic amounts of tertiary amine, immiscible or insoluble mixtures of about from 1 to 3 moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine about from one to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyante, chlorophenyl isocyanate, dichlorophenyl isocyanate, and bromophenyl isocyanate, if stirred vigorously during the initial part of the reaction. The insoluble or immiscible polyhydric alcohol gradually dissolves into the isocyanates as the reaction proceeds, thus making it possible to stir the mixture into a homogeneous mass before the reaction mixture becomes too viscous and too highly exothermic. The mixture of polyhydric alcohols, polyurethanes, and isocyanate becomes homogeneous before external cooling is necessary to moderate the reaction and retard the vaporization of monoisocyanates. By selecting the proper ratio of polyhydric alcohol, diisocyanate, and monoisocyanate, it is possible to synthesize a homogeneous reaction product which is fluid at 150° C. but becomes solid and brittle at room temperature. The fluid nature of the reaction product at 150° C. promotes the formation of the polyurethane, and the solid, brittle nature of the product facilitates pulverization of the product to a fine powder suitable for coating compositions. On the other hand, harder and higher melting, water-resistant carbonific polyurethanes can be prepared with polyhydric alcohols and polyisocyanates.

Although we have found the above limits of concentration of the reactants to be operable for this invention, we prefer to use from two to three moles of pentaerythritol, one to two moles of tolylene diisocyanate and 0 to eight moles of phenyl isocyanate to obtain the best water-resistant carbonific polyurethane product.

Our invention also includes the discovery that highly water-resistant polyaminotriazine phosphates, such as 2,4,6-triaminotriazine and 2,4 - diamino-6-phenyltriazine phosphates can be synthesized from about from one to two moles of a polyaminotriazine selected from the group consisting of 2,4,6-triaminotriazine and 2,4-diamino - 6-phenyltriazine with about from one to two moles of a phosphorus-containing compound selected from the group consisting of phosphoric acid, chloromethylphosphonic acid, phenylphosphonic acid and butyl acid phosphate and mixtures thereof, by vigorous mixing in aqueous suspension. Polyaminotriazine phosphates have been prepared by previous investigators from melamine and phosphoric acids or phosphoric anhydride, but such products were frequently nonhomogeneous mixtures, contained pyrophosphate linkages, had appreciable water solubility, and hygroscopicity, which inherently makes such materials unsuitable for use in development of exterior, intumescing, fire-retardant coating compositions. Paint formulations developed with such melamine phosphates produce paint films which exhibit poor weather resistance, resulting in leaching, blistering and poor fire-retardancy.

In our process 0.6 mole of 20% phosphoric acid is reacted with 0.6 mole of the polyaminotriazine suspended in 300–400 ml. of water by vigorous agitation in a Waring Blendor. Continued rapid mixing for about ten minutes results in a homogeneous slurry of the polyaminotriazine phosphates. The water is driven off and the material dried in a mechanical convection oven between 100° C. and 120° C. over a 10–16 hour period. The dried polyaminotriazine phosphates are then heated at 205° C. to 220° C. for about five hours. It is this critical heating temperature which is essential in producing polyaminotriazine phosphates with reduced solubility and minimum hygroscopicity. The data in Table I shows that heating above the preferred range of 205–215° C. (e.g. 220° C.) results in slightly lower water solubility but increased hygroscopicity and decomposition, these latter evidenced by the release of ammonia vapors and weight loss. Insufficient heating on the other hand results in a product of greater hygroscopicity and water solubility.

TABLE I.—EFFECT OF HEATING ON THE WATER-RESISTANT AND HYGROSCOPIC PROPERTIES OF 2,4,6-TRIAMINOTRIAZINE PHOSPHATES

| Heating | | | Water solubility at 100° C. (g./100 ml.) | Moisture absorption [1] at 25° C. (percent in 48 hrs.) |
| --- | --- | --- | --- | --- |
| Temp. (° C.) | Time (hrs.) | Weight loss (percent) | | |
| 120 | 16 | | >4.5 | 5.8 |
| 200 | 5 | 5.6 | <1.0 | 4.9 |
| 210 | 5 | 5.6 | <1.0 | 2.8 |
| 220 | 5 | [2] 7.6 | <0.25 | 8.1 |
| 250 | 5 | [2] 13.8 | <0.25 | 22.5 |

[1] In presence of 100% relative humidity.
[2] Evolution of ammonia gas indicated decomposition at these higher heating temperatures; none was observed at the lower temperatures.

It is this greater hygroscopicity and/or water solubility which makes the polyaminotriazine phosphates unsuitable in exterior, fire-retardant, intumescing coatings as they will absorb moisture when exposed to humidity causing blistering and rupturing of the film, or they will be leached out by contact with water resulting in coatings having inferior fire-retardant properties. The product heated at 210° C. is less than 1% soluble in boiling water, and it is only very slightly hydroscopic in the presence of a water-saturated atmosphere. Consequently, paint formulations developed from these water-resistant nonhygroscopic polyaminotriazine phosphates produce weather-resistant, blister-resistant, and more fire-retardant paint films.

Most of the limits of the concentrations and reaction conditions for the preparation of these polyaminotriazine phosphates may be varied in accordance with those indicated above, but the final heating step is most critical. We have found that the best water-resistant, spumific, fire-retardant polyaminotriazine phosphate was obtained by reacting 0.6 mole of 2,4,6-triaminotriazine in about 350 ml. of water with 0.6 mole of 20% phosphoric acid under vigorous agitation in a Waring Blendor, drying at between 100° C. and 120° C. for about 16 hours, and then heating at 205° C. to 220° C. but preferably at 210° C. for about five hours.

Our invention includes the discovery that water-resistant, intumescing, fire-retardant materials can be prepared by mixing about from 20 to 80 weight percent of these water-resistant, carbonific polyurethanes with about from 20 to 80 weight percent of these spumific polyaminotriazine phosphates. Our invention also includes the discovery that such water-resistant, intumescing, fire-retardant materials can also be prepared by mixing about from 20 to 80 weight percent of these water-resistant, carbonific polyurethanes, about from 20 to 80 weight percent of polyhaloalkyl phosphorus compounds selected from the group consisting of tris(2,3-dibromopropyl)phosphate, tris(2-chloroethyl)phosphate, tris(2,3 - dichloropropyl)phosphate, tris(1-chloro-3-bromoisopropyl)phosphate, bis(1-chloro - 3 - bromoisopropyl) 1 - chloro-3-bromoisopropylphosphonate, and about from 2 to 50 weight percent of polyaminotriazine. Such water-resisant, intumescing, fire-retardant materials can also be prepared by mixing about from 20 to 80 weight percent of these carbonific polyurethanes, about from 10 to 50 weight percent of said polyhaloalkyl phosphorus compounds, and about from 10 to 50 weight percent of said polyaminotriazine phosphates.

Our invention further includes the discovery that these highly water-resistant polyaminotriazine phosphates act synergistically with the water-resistant carbonific polyurethanes to improve the intumescing fire-retardant properties of our exterior and interior, intumescing, fire-retardant coating compositions. In addition, polyhaloalkyl phosphates and phosphonates, such as tris(2,3-dibromopropyl) phosphate, tris(2,3 - dichloropropyl) phosphate, tris(2-chloroethyl) phosphate, tris(1-chloro-3-bromoisopropyl) phosphate, and bis(1-chloro-3-bromoisopropyl) 1-chloro-3-bromoisopropylphosphonate act synergistically with the water-resistant, carbonific polyurethanes to improve the intumescing fire-retardant properties of our exterior and interior, intumescing, fire-retardant coating compositions.

More specifically, our invention includes the discovery that weather-resistant, intumescing, fire-retardant coatings can be formulated with about from 10 to 40 weight percent of a water-resistant, intumescing, fire-retardant material prepared by mixing about from 20 to 80 weight percent of these water-resistant, carbonific polyurethanes, about from 20 to 80 weight percent of these polyhaloalkyl phosphorus compounds, and about from 0 to 50 weight percent of 2,4,6-triaminotriazine, with the other ingredients described below. Such water-resistant, intumescing, fire-retardant coatings can also be formulated with about from 10 to 40 weight percent of a water-resistant, intumescing, fire-retardant material prepared by mixing about from 20 to 80 weight percent of said water-resistant, carbonific polyurethanes, about from 10 to 50 weight percent of said polyhaloalkyl phosphorus compounds, and about from 10 to 50 weight percent of said polyaminotriazine phosphates, with the other ingredients described below.

As a result of these several discoveries we have developed good exterior and interior, intumescing, fire-retardant coating compositions that we prepare by milling about from 25 to 33 weight percent of an oil-modified alkyd vehicle, the latter prepared by the method described in patent application No. 179,818, filed March 14, 1962, about from 100 to 150 parts of drying oils with conjugated unsaturation, about from 100 to 50 parts of drying oil fatty acids, essentially devoid of conjugated unsaturation, about 35 parts of trimethylolethane, about 43 parts of chlorendic (1,4,5,6,7,7-hexachlorobicyclo-(2.2.1)-5-heptene-2,3-dicarboxylic) acid, and about 19 parts of tolylene diisocyanate; or about from 5 to 30 weight percent of the above oil modified alkyd vehicle and about from 0 to 25 weight percent of a bodied drying oil such as air-blown tung oil (R. O. Austin, et al., Official Digest, 35, 487–499 (1963)); with about from 10 to 40 weight percent of a water-resistant, intumescing, fire-retardant material prepared by mixing about from 20 to 80 weight percent of a polyhaloalkyl phosphorus compound selected from the group consisting of tris(2,3-dibromopropyl) phosphate, tris(2,3-dichloropropyl) phosphate, tris(2-chloroethyl) phosphate, tris(1-chloro-3-bromoisopropyl) phosphate, and bis(1-chloro-3-bromoisopropyl) 1-chloro-3-bromoisopropylphosphonate, with about from 20 to 80 weight percent of the water-resistant, carbonific polyurethanes prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine, about from 0 to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyanate, chlorophenyl isocyanate, dichlorophenyl isocyanate, and bromophenyl isocyanate; with about from 0 to 50 weight percent of 2,4,6-triaminotriazine; with about six weight percent of 70% chlorinated paraffin; with about five weight percent of the polyamide of dimerized linoleic acid and ethylenediamine; with about from 15 to 40 weight percent of a pigment composition made from about 12 parts of titanium dioxide, about 35 parts of zinc borate, about two parts of magnesium silicate, about 20 parts of lead sudlfate, about 20 parts of lead carbonate, and about 11 parts of zinc oxide; and thinning the mixed components with an organic solvent to a viscosity of about 90 Krebs units.

We can also prepare good water-resistant exterior and interior intumescing, fire-retardant coating compositions by milling from 10 to 30 weight percent of these water-resistant, carbonific polyurethanes with the oil modified vehicles, pigments. and fillers described above without the presence of the polyhaloalkyl phosphates and polyaminotriazine phosphates.

We can also prepare water-resistant, carbonific polycarbonates by reacting at about from 80 to 120° C. about from one to two moles of a polyhydric alcohol selected from the group consisting of pentaerythritol, dipentaerythritol, and tripentaerythritol; with about from one to four moles of a glycol bis(chloroformate) selected from the group consisting of ethylene glycol bis(chloroformate) and diethylene glycol bis(chloroformate); and with about from one to five moles of an alkyl chloroformate selected from the group consisting of ethyl chloroformate, propyl chloroformate, isopropyl chloroformate, butyl chloroformate, isobutyl chloroformate, and pentyl chloroformate. These water-resistant, carbonific polycarbonates we use to produce white exterior and interior, intumescing, fire-retardant paint formulations by milling about from 15 to 25% of the said polycarbonates with about from five to 15% of the water-resistant, spumific, fire-retardant polyaminotriazine phosphates with the oil modified alkyd vehicle, pigments, and fillers as previously described.

Water-resistant, carbonific polycarbonates prepared within the range of reactants, conditions and limits of the process described above are all acceptable materials to fulfil the objective of this invention, but in practice we prefer to employ for this purpose one to two moles of dipentaerythritol, two to three moles of ethylene glycol bis(chloroformate), and two to four moles of an alkyl chloroformate, and to react these at about from 80 to 120° C. until the evolution of hydrogen chloride has ceased.

Our invention includes the discovery that water-resistant, intumescing, fire-retardant materials can be prepared by mixing about from 20 to 80 weight percent of these water-resistant, carbonific polycarbonates with about from 20 to 80 weight percent of the above water-resistant, spumific polyaminotriazine phosphates.

Our invention further includes the discovery that weather-resistant, intumescing, fire-retardant coatings can be formulated with about from 10 to 40 weight percent of a water-resistant, intumescing, fire-retardant material prepared by mixing about from 20 to 80 weight percent of these water-resistant, carbonific polycarbonates, with about 20 to 80 weight percent of the above water-resistant, spumific polyaminotriazine phosphates, and with the other ingredients described above.

We can also prepare water-resistant, intumescing, fire-retardant poly(urea-urethane - phosphate-phosphonates) by reacting about from room temperature to 180° C. and in the presence of a tertiary amine catalyst, about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl) melamine; with about from one to three moles of a polyhydric alkyl phosphate, or phosphonate, or both, selected from the group consisting of a dialkyl dihydroxyalkyl phosphate, dialkyl dialkylolaminoalkylphosphonate, dialkyl dihydroxyalkylphosphonate, and dialkyl dihydroxychloroalkylphosphonate; with about from one to two moles of a polyaminotriazine selected from the group consisting of 2,4,6-triaminotriazine, and 2,4-diamino-6-phenyltriazine; with about from one to six moles of a polyisocyanate selected from the group consisting of tolylene diisocyanate, trichlorophenyl diisocyanate, biphenylene diisocyanate, and hexamethylene diisocyanate; and with from about two to ten moles of a monoisocyanate selected from the group consisting of phenyl isocyanate, chlorophenyl isocyanate, dichlorophenyl isocyanate, and bromophenylisocyanate. These water-resistant intumescing, fire-retardant poly(urea - urethane-phosphate-phosphonates) we use to develop exterior and interior, intumescing, fire- retardant paint formulations by milling about from 15 to 25% of the said poly(urea-urethane-phosphate-phosphonates) with about from 5 to 15% of the polyhaloalkyl phosphates, such as tris(2,3-dibromopropyl) phosphate, tris(2,3-dichloropropyl) phosphate, and tris(1-chloro-3-bromoisopropyl) phosphate, and with the oil modified alkyd vehicle, pigments and fillers previously described.

For all purposes of this invention water-resistant intumescing, fire-retardant poly(urea-urethane-phosphate-phosphonates) are produced within the range of reactant concentrations and processing conditions enumerated above, but in practice for the better water-resistant, intumescing, fire-retardant materials of these descriptions we prefer to combine two to three moles of pentaerythritol, one to two moles of dialkyl dihydroxyalkyl phosphate, one to two moles of a dialkyl dihydroxyalkylaminophosphonate, one to two moles of 2,4,6-triaminotriazine, three to six moles of tolylene diisocyanate, and four to eight moles of phenyl isocyanate.

Our invention includes the discovery that the water-resistant, intumescing, fire-retardant materials can be prepared by mixing about from 20 to 80 weight percent of these water-resistant, intumescing, fire-retardant poly-(urea-urethane-phosphate-phosphonates) with about from 20 to 80 weight percent of the above-mentioned polyhaloalkyl phosphorus compounds.

Our invention further includes the discovery that weather-resistant, intumescent, fire-retardant coatings can be formulated with about from 10 to 40 weight percent of a water-resistant, intumescing, fire-retardant material prepared by mixing about from 20 to 80 weight percent of these water-resistant poly(urea-urethane-phosphate-phosphonates) with about from 20 to 80 weight percent of the above polyhaloalkyl phosphorus compounds, and with the other ingredients described above.

We can also prepare water-resistant, intumescing, fire-retardant poly(urethane-phosphates) by reacting about from room temperature to 150° C. about from one to three moles of a polyhydric alcohol selected from the group consisting of pentaerythritol, dipentaerythritol and tripentaerythritol, with about from one to three moles of an alkyl phosphorodichloridate or alkylphophonodichloridate, or both, selected from the group consisting of ethyl phosphorodichloridate, phenylphosphonodichloridate and chloromethylphosphonodichloridate, with about 0 to six moles of a dialkyl phosphorochloridate selected from the group consisting of diethyl phosphorochloridate and dibutyl phosphorochloridate, followed with about from one to three moles of a polyisocyanate selected from the group consisting of tolylene diisocyanate, trichlorophenyl diisocyanate, biphenylene diisocyanate and hexamethylene diisocyanate, with about from 0 to 8 moles of a monoisocyanate selected from the group consisting of phenyl isocyanate, chlorophenyl isocyanate, dichlorophenyl isocyanate, and bromophenyl isocyanate. These water-resistant, intumescing, fire-retardant poly(urethane-phosphates) we use to develop intumescing, fire-retardant paint formulations by milling about from 5 to 30% of the said poly(urethane-phosphates) with about from 0 to 20% of the water-resistant carbonific pentaerythritol polyurethanes, with about from five to fifteen percent of the polyhaloalkyl phosphates or phosphonates, such as tris(2,3-dibromopropyl) phosphate, tris(2,3 - dichloropropyl) phosphate, tris(1 - chloro - 3 - bromoisopropyl) phosphate and bis(1 - chloro - 3 - bromoisopropyl) 1 - chloro - 3-bromoisopropylphosphonate and with the oil modified alkyd vehicle, pigments and fillers previously described.

We have found that our exterior and interior, intumescing, fire-retardant coating compositions can be utilized in multiple-formulation paint systems as well as single-formulation paint systems. That is, a resistant topcoat can be applied over our exterior or interior, intumescing, fire-retardant undercoats. This feature is well illustrated in Table II with Formulations A and B. This versatile property can be employed to produce special type finishes.

The preceding descriptions and processes establish the general kinds of water-resistant, carbonific and/or spumific materials that were synthesized and found useful for incorporation with pigments, vehicles, and other ingredients into coating formulations to produce exterior and interior, intumescing, fire-retardant paints. The following examples present a few particular products, compositions or formulations and illustrate the objectives of this invention, but these should by no means be construed to exclude similar preparations or formulations, as our invention is not limited to the specific examples.

In these formulations, where reference is made to a "polyamide resin," the material used was a commercially available resin sold under the trade mark "Versamid 930," a polyamide of ethylenediamine and dimerized linoleic acid, as disclosed in Technical Bulletin 11–B–1 (1960) of the General Mills Chemical Division and produced in accordance with U.S. Patent No. 2,379,413. This resin has a maximum Gardner color of 12, a softening point of 105–115° C., a Brookfield viscosity of 21–27 poises at 160° C., and an amine value in the range of 1.4 to 7, as shown in Technical Bulletin 11–D–3 (1960) of the same manufacturer.

Example 1.—Preparation of a water-resistant, carbonific polyurethane material

Two moles of pentaerythritol, five moles of phenyl isocyanate, one mole of tolylene diisocyanate, and 0.1% of diethylaminoethanol catalyst were mixed in a metal beaker equipped with a stirrer, thermometer and heating mantle. Heating the stirred slurry slowly to about 60° C. initiated an exothermic reaction of the isocyanates with the polyol, which then caused the temperature to increase spontaneously to about 180° C. or higher. Below 100° C. the temperature increased slowly but above 100° C. the temperature rose so rapidly that it was necessary to cool the reaction mixture. After this initial spontaneous reaction subsided the molten mixture was heated for three hours between 100 and 160° C. and then cured overnight for about twelve hours at about 150° C. in a gravity convection oven. When cooled the clear, almost colorless resin was pulverized and sieved through a 100-mesh screen to give a powdered, water-resistant carbonific polyurethane product.

When carbonific polyurethane materials are prepared omitting the monoisocyanates, a procedure as follows can be used. Three moles of pentaerythritol, two moles of tolylene diisocyanate, and 0.1% of diethylaminoethanol catalyst were stirred vigorously in a 1-liter metal beaker and gradually heated to 100–120° C. for several minutes. The viscous mass was then poured into a Teflon-lined container and cured at about 150° C. for about twelve hours in a gravity convection oven. When cooled the hard, white material was pulverized and sieved through a 325-mesh screen to give a powdered, water-resistant carbonific polyurethane product.

Example 2.—Preparation of carbonific, spumific, fire-retardant phosphorous-containing polyurethane material (1) To two moles of pentaerythritol, one mole of melamine, and one mole of a dihydroxyalkyl dialkyl phosphate slurried in a metal beaker was added four moles of phenyl isocyanate and four moles of tolylene diisocyanate. To the stirred mixture was slowly added one mole of a dialkyl dialkylolaminoalkylphosphonate. The spontaneous, exothermic reaction which covers a temperature range about from room temperature to 180° C. was regulated by the rate of addition of the phosphonate component. After the initial reaction subsided the material was heated at about 120° C. for at least 16 hours. When cooled, the product was pulverized and sieved through a 100-mesh screen. In this reaction the dialkyl dialkylolaminoalkylphosphonate functions as a catalyst to promote the formation of the urethanes since it has a tertiary amino nitrogen.

(2) One mole of pentaerythritol and one mole of chloromethylphosphonodichloridate were stirred in a two-liter glass beaker equipped with a thermometer, stirrer, and heating mantle. An exothermic reaction occurred which gradually increased the temperature to about 60° C. in about one hour. The mixture was then heated to about 135° C. for about three hours or until about 88% of the hydrogen chloride had been evolved. The mixture was cooled to about 50° C. and diluted with about one volume of acetone. The reaction mixture was stirred, and one mole of tolylene diisocyanate was added. A spontaneous exothermic and foamy reaction occurred which increased the temperature to about 75° C. Foaming was moderated by rapid stirring which resulted in a homogeneous product. After curing at about 100° C. for about 24 hours, the pale yellow product was pulverized and sieved through a 100-mesh screen to yield a fine water-resistant carbonific, spumific, fire-retardant powder which could readily be formulated into fire-retardant coatings.

Example 3.—Preparation of water-resistant, fire-retardant, spumific, polyaminotriazine phosphates Six-tenths of a mole of 20% phosphoric acid was rapidly added to 0.6 mole of 2,4,6-triaminotriazine suspended in 350 milliliters of water by vigorous agitation in a Waring Blendor. After continued thorough mixing for ten minutes the water was removed by evaporation in a forced draft oven at 120° C. for about 16 hours. The dried triaminotriazine phosphates were then heated at 210° C. for five hours to obtain a fire-retardant, spumific product of maximum water-resistance.

Example 4.—Preparation of water-resistant, carbonific polycarbonate

One mole of dipentaerythritol, two moles of ethylene glycol bis(chloroformate) and two moles of isopropyl chloroformate were mixed and reacted for about 24 hours between 80 and 120° C. in a container equipped with an air condenser until the evolution of hydrogen chloride ceased.

Example 5.—Preparation of a dehydrated castor-tung oil alkyd

The dehydrated castor-tung oil alkyd "a" was prepared by the following procedure as described in our previously submitted patent application No. 179,818, filed Mar. 14, 1962.

ALKYD a

| Components: | Parts |
|---|---|
| Dehydrated castor oil | 50 |
| Tung oil | 50 |
| Linseed fatty acids | 100 |
| Trimethylolethane | 35 |
| Chlorendic (1,4,5,6,7,7-hexachlorobicyclo-(2.2.1)-5-heptene-2,3-dicarboxylic) acid | 43 |
| Tolylene diisocyanate | 19 |

The oil components and 50% of the trimethylolethane were alcoholyzed and gasproofed in the presence of 0.03% litharge at 300° C. for eight minutes.

The temperature of the mixture was reduced to 280° C., then the linseed fatty acids, the remainder of the trimethylolethane, and 2% of triphenyl phosphite (as an esterification catalyst and color stabilizer) were added. Reaction was continued at about 250° C. until 80 to 90% of the theoretical amount of water of esterification was evolved. The temperature was reduced to 150° C., then the chlorendic acid and several milliliters of benzene were added. The mixture was esterified further at about 180° C. under reflux until practically all of the remaining water of esterification was removed azeotropically (acid value of about 6). The temperature was reduced to about 100° C., then the tolylene diisocyanate and 0.1% diethylethanolamine catalyst were added, and the mixture was then heated at 110-120° C. for about two hours. After standing overnight at room temperature, several milliliters of absolute alcohol was added to prevent excessive crosslinking upon aging.

Example 6

ALKYD b

| Components: | Parts |
|---|---|
| Tung oil | 100 |
| Linseed fatty acids | 100 |
| Trimethylolethane | 35 |
| Chlorendic (1,4,5,6,7,7-hexachlorobicyclo-(2.2.1)-5-heptene-2,3-dicarboxylic) acid | 43 |
| Tolylene diisocyanate | 19 |

The ingredients listed above were reacted in the same manner as the ingredients that were used to prepare alkyd "a" above, as described in Example 5.

Example 7

ALKYD c

| Components: | Parts |
|---|---|
| Dehydrated castor oil | 20 |
| Tung oil | 80 |
| Linseed fatty acids | 100 |
| Trimethylolethane | 35 |
| Chlorendic (1,4,5,6,7,7-hexachlorobicyclo (2.2.1)-5-heptene-2,3-dicarboxylic) acid | 43 |
| Tolylene diisocyanate | 19 |

The ingredients listed above were reacted in the same manner as the ingredients that were used to prepare alkyd "a" above, as described in Example 5.

Preparation of fire-retardant, intumescent paints

The alkyd, the carbonific and spumific components, pigments, and other paint ingredients of the formulations were milled together in preparing the various intumescent, fire-retardant paints. Mineral spirits or Hi-Flash naphtha was added to these paint formulations as needed to adjust their final viscosity. As will be recognized by those skilled in the art, coating thickness and ease of spreadability (brushability) are the use factors related to viscosity and, for the purposes of this invention, a final viscosity within a range of about from 80 to 110 Krebs units was desired, with a value of about 90 Krebs units being preferred.

Listed below are several examples of intumescing, fire-retardant paint formulations prepared with the carbonific-spumific compositions described in these specifications.

FORMULATION A

| Components:[1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 5.00 |
| Water-resistant, fire-retardant spumific[2] | 10.00 |
| Water-resistant carbonific polyurethane[3] | 20.00 |
| Alkyd "a"[4] | 30.00 |
| 70% chlorinated paraffin | 5.62 |
| Polyamide resin[5] | 4.58 |
| Cobalt naphthenate solution (6% cobalt as metal) | 0.10 |

FORMULATION A—Continued

| Components:[1] | Percent of non-volatiles |
|---|---|
| Lead naphthenate solution (24% lead as metal) | 0.40 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] 2,4,6-triaminotriazine phosphates.
[3] Prepared from two moles pentaerythritol, five moles phenyl isocyanate, and one mole tolylene diisocyanate.
[4] Alkyd was added as a mineral spirits solution of 65% solids content.
[5] 64 grams General Mills' Versamid No. 930 was disolved in 41 grams n-butanol by heating, then 75 grams of mineral spirits was added.

FORMULATION B

| Components:[1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 10.00 |
| Melamine | 5.00 |
| Water-resistant carbonific polyurethane[2] | 20.00 |
| Alkyd "a"[3] | 30.00 |
| 70% chlorinated paraffin | 5.60 |
| Polyamide resin[4] | 4.29 |
| Cobalt naphthenate solution (6% cobalt as metal) | 0.16 |
| Lead naphthenate solution (24% lead as metal) | 0.65 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Prepared from two moles pentaerythritol, five moles phenyl isocyanate, and one mole tolylene diisocyanate.
[3] Alkyd was added as a mineral spirits solution of 65% solids content.
[4] 64 grams of General Mills' Versamid No. 930 was dissolved in 41 grams n-butanol by heating, then 75 grams of mineral spirits was added.

FORMULATION C

| Components:[1] | Percent of non-volatiles |
|---|---|
| Titanium dioxide | 4.89 |
| Zinc borate | 14.38 |
| Magnesium silicate (Mistron) | 0.72 |
| Lead sulfate | 8.20 |
| Lead carbonate | 8.20 |
| Zinc oxide | 4.61 |
| Water-resistant carbonific polyurethane[2] | 18.00 |
| Alkyd "a"[3] | 30.00 |
| 70% chlorinated paraffin | 5.62 |
| Polyamide resin[4] | 4.58 |
| Cobalt naphthenate solution (6% cobalt as metal) | 0.10 |
| Lead naphthenate solution (24% lead as metal) | 0.40 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Prepared from two moles pentaerythritol, five moles phenyl isocyanate, and one mole tolylene diisocyanate.
[3] Alkyd was added as a mineral spirits solution of 65% solids content.
[4] 64 grams of General Mills' Versamid No. 930 was dissolved in 41 grams of n-butanol by heating, then 75 grams of mineral spirits was added.

FORMULATION D

| Components:[1] | Percent of non-volatiles |
|---|---|
| Titanium dioxide | 4.89 |
| Zinc borate | 14.38 |
| Magnesium silicate (Mistron) | 0.72 |
| Lead sulfate | 8.20 |
| Lead carbonate | 8.20 |
| Zinc oxide | 4.61 |
| Pentaerythritol | 18.00 |
| Alkyd "a"[2] | 30.00 |
| 70% chlorinated paraffin | 5.62 |
| Polyamide resin[3] | 4.58 |
| Cobalt naphthenate solution (6% cobalt as metal) | 0.10 |
| Lead naphthenate solution (24% lead as metal) | 0.40 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Alkyd was added as a mineral spirits solution of 65% solids content.
[3] 64 grams of General Mills' Versamid No. 930 was dissolved in 41 grams of n-butanol by heating, then 75 grams of mineral spirits was added.

FORMULATION E

| Components:[1] | Percent of non-volatiles |
|---|---|
| Titanium dioxide | 7.51 |
| Magnesium silicate (Mistron) | 1.09 |
| Lead sulfate | 12.62 |
| Lead carbonate | 12.62 |
| Zinc oxide | 7.16 |
| Water-resistant carbonific polyurethane[2] | 18.00 |
| Alkyd "a"[3] | 30.00 |
| 70% chlorinated paraffin | 5.62 |
| Polyamide resin[4] | 4.58 |
| Cobalt naphthenate solution (6% cobalt as metal) | 0.10 |
| Lead naphthenate solution (24% lead as metal) | 0.40 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Prepared from two moles of pentaerythritol, five moles phenyl isocyanate, and one mole tolylene diisocyanate.
[3] Alkyd was added as a mineral spirits solution of 65% solids content.
[4] 64 grams of General Mills' Versamid No. 930 was dissolved in 41 grams of n-butanol by heating, then 75 grams of mineral spirits was added.

FORMULATION F

| Components:[1] | Percent of non-volatiles |
|---|---|
| Titanium dioxide | 5.84 |
| Zinc borate | 17.19 |
| Magnesium silicate (Mistron) | 0.85 |
| Lead sulfate | 9.80 |
| Lead carbonate | 9.80 |
| Zinc oxide | 5.52 |
| Tris(2,3-dibromopropyl) phosphate | 10.00 |
| Alkyd "a"[2] | 30.00 |
| 70% chlorinated paraffin | 5.60 |
| Polyamide resin[3] | 4.54 |
| Cobalt naphthenate solution (6% cobalt as metal) | 0.11 |
| Lead naphthenate solution (24% lead as metal) | 0.45 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Alkyd was added as a mineral spirits solution of 65% solids content.
[3] 64 grams of General Mills' Versamid No. 930 was dissolved in 41 grams of n-butanol by heating, then 75 grams of mineral spirits was added.

FORMULATION G

| Components:[1] | Percent of non-volatiles |
|---|---|
| Titanium dioxide | 7.03 |
| Zinc borate | 20.70 |
| Magnesium silicate (Mistron) | 1.02 |
| Lead sulfate | 11.80 |
| Lead carbonate | 11.80 |
| Zinc oxide | 6.65 |
| Alkyd "a"[2] | 30.00 |
| 70% chlorinated paraffin | 5.60 |
| Polyamide resin[3] | 4.54 |
| Cobalt naphthenate solution (6% cobalt as metal) | 0.11 |
| Lead naphthenate solution (24% lead as metal) | 0.45 |
| Anti-skinning agent (National ASA) | 0.15 |
| Ultraviolet screening agent (UVINUL No. 490) | 0.15 |
| Total | 100.00 |

[1] Mineral spirits was added to adjust final paint viscosity to about 90 Krebs units.
[2] Alkyd was added as a mineral spirits solution of 65% solids content.
[3] 64 grams of General Mills' Versamid No. 930 was dissolved in 41 grams of n-butanol by heating, then 75 grams of mineral spirits was added.

FORMULATION H

| Components:[1] | Percent of non-volatiles |
|---|---|
| Titanium dioxide | 7.50 |
| Zinc borate | 22.10 |
| Magnesium silicate (Mistron) | 1.10 |
| Lead sulfate | 12.60 |
| Lead carbonate | 12.60 |
| Zinc oxide | 7.10 |
| Alkyd "b"[2] | 26.00 |
| 70% chlorinated paraffin | 5.73 |
| Polyamide resin[3] | 4.98 |
| Cobalt naphthenate solution (6% cobalt as metal) | 0.02 |
| Lead naphthenate solution (24% lead as metal) | 0.07 |
| Anti-skinning agent (National ASA) | 0.10 |
| Ultraviolet screening agent (UVINUL No. 490) | 0.10 |
| Total | 100.00 |

[1] Mineral spirits was added to adjust final paint viscosity to about 90 Krebs units.
[2] Alkyd was added as a mineral spirits solution of 50% solids content.
[3] 64 grams of General Mills' Versamid No. 930 was dissolved in 41 grams of n-butanol by heating, then 75 grams of mineral spirits was added.

FORMULATION I

| Components:[1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 5.00 |
| Water-resistant, fire-retardant spumific[2] | 10.00 |

FORMULATION I—Continued

| Components:[1] | Percent of non-volatiles |
|---|---|
| Water-resistant, carbonific polyurethane [3] | 20.00 |
| Alkyd "c" [4] | 30.00 |
| 70% chlorinated paraffin | 5.60 |
| Polyamide resin [5] | 4.54 |
| Cobalt naphthenate solution (6% cobalt as metal) | 0.06 |
| Lead naphthenate solution (24% lead as metal) | 0.55 |
| Anti-skinning agent (National ASA) | 0.10 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] 2,4,6-triaminotriazine phosphates.
[3] Prepared from two moles pentaerythritol, two moles phenyl isocyanate, and one mole tolylene diisocyanate.
[4] Alkyd was added as a Solvesso-100 solution of 65% solids content.
[5] 64 grams General Mills' Versamid No. 930 was dissolved by heating in 41 grams absolute ethanol and 75 grams Solvesso-100.

FORMULATION J

| Components: [1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 10.00 |
| Water-resistant, carbonific polyurethane [2] | 25.00 |
| Alkyd "a" [3] | 30.00 |
| 70% chlorinated paraffin | 5.60 |
| Polyamide resin [4] | 4.54 |
| Cobalt naphthenate solution (6% cobalt as metal) | 0.11 |
| Lead naphthenate solution (24% lead as metal) | 0.45 |
| Anti-skinning agent (National ASA) | 0.15 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] Prepared from two moles pentaerythritol, five moles phenyl isocyanate, and one mole tolylene diisocyanate.
[3] Alkyd was added as a Solvesso-100 solution of 65% solids content.
[4] 64 grams General Mills' Versamid No. 930 was dissolved by heating in 41 grams absolute ethanol and 75 grams Solvesso-100.

FORMULATION K

| Components: [1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 5.00 |
| Water-resistant fire-retardant spumific [2] | 10.00 |
| Water-resistant carbonific polyurethane [3] | 20.00 |
| Alkyd "c" [4] | 30.00 |
| 70% chlorinated paraffin | 5.60 |
| Polyamide resin [5] | 4.54 |
| Cobalt naphthenate solution (6% cobalt as metal) | 0.06 |
| Lead naphthenate solution (24% lead as metal) | 0.55 |

FORMULATION K—Continued

| Components:[1] | Percent of non-volatiles |
|---|---|
| Anti-skinning agent (National ASA) | 0.10 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] 2,4,6-triaminotriazine phosphates.
[3] Prepared from three moles pentaerythritol, and two moles tolylene diisocyanate.
[4] Alkyd was added as a Solvesso-100 solution of 65% solids content.
[5] 64 grams General Mills' Versamid No. 930 was dissolved by heating in 41 grams absolute ethanol and 75 grams Solvesso-100.

FORMULATION L

| Components: [1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 8.00 |
| Water-resistant fire-retardant spumific [2] | 12.00 |
| Water-resistant carbonific polyurethane [3] | 18.00 |
| Alkyd "c" [4] | 27.00 |
| 70% chlorinated paraffin | 5.60 |
| Polyamide resin [5] | 4.54 |
| Cobalt naphthenate solution (6% cobalt as metal) | 0.06 |
| Lead naphthenate solution (24% lead as metal) | 0.55 |
| Anti-skinning agent (National ASA) | 0.10 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] 2,4,6-triaminotriazine phosphates.
[3] Prepared from three moles pentaerythritol, and two moles tolylene diisocyanate.
[4] Alkyd was added as a Solvesso-100 solution of 65% solids content.
[5] 64 grams General Mills' Versamid No. 930 was dissolved by heating in 41 grams absolute ethanol and 75 grams Solvesso-100.

FORMULATION M

| Components: [1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 8.00 |
| Water-resistant fire-retardant spumific [2] | 12.00 |
| Water-resistant carbonific polyurethane [3] | 20.00 |
| Alkyd "c" [4] | 25.00 |
| 70% chlorinated pariffin | 5.60 |
| Polyamide resin [5] | 4.09 |
| Cobalt naphthenate solution (6% cobalt as metal) | 0.11 |
| Lead naphthenate solution (24% lead as metal) | 0.90 |
| Anti-skinning agent (Troykyd anti-skin) | 0.15 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] 2,4,6-triaminotriazine phosphates.
[3] Prepared from three moles pentaerythritol, and two moles tolylene diisocyanate.
[4] Alkyd was added as a Solvesso-100 solution of 65% solids content.
[5] 64 grams General Mills' Versamid No. 930 was dissolved by heating in 41 grams absolute ethanol and 75 grams Solvesso-100.

FORMULATION N

| Components:[1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 10.00 |
| Water-resistant carbonific polyurethane [2] | 25.00 |
| Alkyd "a"[3] | 20.00 |
| Air-blown tung oil ($Z_4$–$Z_5$ viscosity)[4] | 10.00 |
| 70% chlorinated paraffin | 5.50 |
| Polyamide resin [5] | 4.54 |
| Cobalt naphthenate solution (6% cobalt as metal) | 0.11 |
| Lead naphthenate solution (24% lead as metal) | 0.50 |
| Anti-skinning agent (Troykyd anti-skin special) | 0.20 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] Prepared from two moles pentaerythritol, five moles phenyl isocyanate, and one mole tolylene diisocyanate.
[3] Alkyd was added as a Solvesso-100 solution of 65% solids content.
[4] Prepared according to R. O. Austin et al., Off. Dig., vol. 35, No. 460, 487–499 (May 1963) and added as a Solvesso-100 solution of 75% solids content.
[5] 64 grams General Mills' Versamid No. 930 was dissolved by heating in 41 grams absolute ethanol and 75 grams Solvesso-100.

FORMULATION O

| Components:[1] | Percent of non-volatiles |
|---|---|
| Titanium dioxide | 2.86 |
| Zinc borate | 8.42 |
| Magnesium silicate (Mistron) | 0.42 |
| Lead sulfate | 4.80 |
| Lead carbonate | 4.80 |
| Zinc oxide | 2.70 |
| Tris(2,3-dibromopropyl) phosphate | 10.00 |
| Water-resistant carbonific polyurethane [2] | 25.00 |
| Alkyd "b"[3] | 30.00 |
| 70% chlorinated paraffin | 5.60 |
| Polyamide resin [4] | 4.54 |
| Cobalt naphthenate solution (6% cobalt as metal) | 0.11 |
| Lead naphthenate solution (24% lead as metal) | 0.45 |
| Anti-skinning agent (National ASA) | 0.15 |
| Ultraviolet screening agent (UVINUL No. 490) | 0.15 |
| Total | 100.00 |

[1] Solvesso-100 Hi-Flash naphtha solvent was added to adjust final paint viscosity to about 90 Krebs units.
[2] Prepared from two moles pentaerythritol, five moles phenyl isocyanate, and one mole tolylene diisocyanate.
[3] Alkyd was added as a mineral spirits solution of 50% solids content.
[4] 64 grams General Mills' Versamid No. 930 was dissolved by heating in 41 grams absolute ethanol and 75 grams Solvesso-100.

Preparation and evaluation of fire-retardant paint films

Test specimens were prepared by applying two or three coats of paint (about three to four mils per coat) onto poplar heartwood panels (6 x 12 x ¼ inches) for evaluation in the standard fire-test cabinet (ASTM D1360–58). The single-formulation and multiple-formulation paint systems were employed. In the multiple-formulation paint system, two undercoats of intumescing fire-retardant paint were applied followed by a topcoat of nonintumescing, fire-retardant paint formulation H. The multiple-paint formulation paint system was employed with paint formulations A and B. See Table II. The different coats of paint were applied about 24 hours apart. The procedure listed in Federal Specification TT–P–34a was followed as closely as possible in the preparation, curing, and evaluation of these test specimens. The weight of each coat of paint and total paint applied on each panel, the weight loss resulting from the fire-retardancy test in the fire-test cabinet, before leaching, after leaching, and after weathering, are reported in Table II.

Numerous intumescing, fire-retardant paint formulations were developed and evaluated, along with some commercial and control experimental compositions, but only the results of representative examples are illustrated in Table II.

Test specimens were prepared by applying from one to three coats of paint (about three to four mils per coat) with a 4-inch brush on one side of exterior grade Douglas fir plywood specimens (19.5 x 96 x ⅜ inches) or on 1 x 4 tongue-and-groove Douglas fir flooring specimens (19.5 x 96 x 1 inches) for evaluation in the Underwriters' Laboratories 25-foot tunnel furnace (ASTM E84–61) or in the elementary SU 8-foot tunnel furnace which was designed to simulate some of the conditions observed in the Underwriters' Laboratories 25-foot tunnel furnace. The coated test specimens were either cured for about 30 days under environmental conditions at 45° south in New Orleans, La., or for about 30 days indoors at room temperature. The coated test specimens evaluated in the Underwriters' Laboratories are classified according to flame-spread, fuel-contributed and smoke-developed index values as illustrated in ASTM E84–61. The coated test specimens evaluated in the elementary SU 8-foot tunnel furnace are classified according to fire-retardant performance, such as presence or absence of blistering and rupturing, adherence or nonadherence between coats of paint and substrate, and presence or absence of fine cellular carbonaceous buildup. The correlation between the fire-retardant performance of coated test specimens in the elementary SU 8-foot tunnel and the Underwriters' Laboratories 25-foot tunnel furnace appears to be very good. These results and observations are reported in Table III.

TABLE II

Evaluation of two- and three-coat paint films, prepared from single- and multiple-paint formulations, for their fire retardancy before leaching, after leaching, and after weathering, according to Federal Specification TT–P–34a*]

| Paint formulations | Paint on panel (gms.) | | | | Panel weight loss after fire-retardancy evaluation (gms) | | |
|---|---|---|---|---|---|---|---|
| | Coats | | | Total | Non-leached | Leached | Weathered [1] |
| | 1st | 2nd | 3rd | | | | |
| A | 20.2 | 15.1 | | 35.3 | 4.1 | | |
| | 18.8 | 13.6 | | 32.4 | | 5.5 | |
| | 19.3 | 15.7 | 13.9 | 48.9 | 5.4 | | |
| | 18.6 | 15.0 | 12.8 | 46.4 | | 5.9 | |
| | 18.2 | 13.8 | 14.0 | 46.0 | | | 5.4 |
| A | 18.6 | 14.4 | [2] 11.8 | 44.8 | 6.4 | | |
| | 18.0 | 14.3 | [2] 12.0 | 44.3 | | 5.7 | |
| | 19.0 | 14.5 | [2] 12.0 | 45.5 | | | 4.6 |
| B | 20.0 | 14.9 | | 34.9 | 5.0 | | |
| | 17.6 | 13.5 | | 31.1 | | 4.1 | |
| | 17.7 | 13.7 | 14.8 | 46.2 | 4.5 | | |
| | 16.6 | 14.2 | 13.0 | 43.8 | | 4.0 | |
| | 19.1 | 13.6 | 14.0 | 46.7 | | | 4.6 |
| B | 18.6 | 14.7 | [2] 9.9 | 43.2 | 6.1 | | |
| | 18.3 | 15.1 | [2] 9.8 | 43.2 | | 4.3 | |
| | 19.6 | 13.9 | [2] 9.4 | 42.9 | | | 4.2 |
| C | 18.1 | 13.8 | | 31.9 | 6.5 | | |
| | 15.8 | 13.0 | | 38.8 | | 6.5 | |
| | 16.8 | 12.5 | 13.0 | 42.3 | 5.7 | | |
| | 15.5 | 13.2 | 12.9 | 41.6 | | 6.5 | |
| D | 16.2 | 13.8 | | 30.0 | 8.7 | | |
| | 16.0 | 14.1 | | 30.1 | | 10.5 | |
| | 16.0 | 14.4 | 13.2 | 43.6 | 6.8 | | |
| | 16.3 | 13.4 | 14.2 | 43.9 | | 9.0 | |

See footnotes at end of table.

TABLE II—Continued

| Paint formulations | Paint on panel (gms.) | | | | Panel weight loss after fire-retardancy evaluation (gms) | | |
|---|---|---|---|---|---|---|---|
| | Coats | | | Total | Non-leached | Leached | Weathered [1] |
| | 1st | 2nd | 3rd | | | | |
| E | 19.4 | 15.2 | | 34.6 | 9.2 | | |
| | 16.5 | 15.2 | | 31.7 | | 9.0 | |
| | 17.8 | 14.8 | 12.2 | 44.8 | 8.4 | | |
| | 17.6 | 16.0 | 12.0 | 45.6 | | 7.0 | |
| F | 16.4 | 13.8 | | 30.2 | 8.8 | | |
| | 14.6 | 14.1 | | 28.7 | | 8.7 | |
| | 16.8 | 15.8 | 11.8 | 44.4 | 8.0 | | |
| | 16.3 | 13.2 | 13.1 | 42.6 | | 8.6 | |
| G | 17.9 | 15.0 | | 32.9 | 10.2 | | |
| | 17.6 | 14.4 | | 32.0 | | 10.0 | |
| | 19.6 | 14.5 | 11.6 | 45.7 | 8.8 | | |
| | 19.5 | 14.4 | 11.3 | 45.2 | | 9.3 | |
| H | 12.1 | 11.6 | | 23.7 | 13.5 | | |
| I | 17.1 | 14.3 | | 31.4 | 5.8 | | |
| | 15.6 | 12.3 | 11.6 | 39.5 | | 5.2 | |
| | 16.2 | 14.5 | | 30.7 | 6.2 | | |
| | 16.4 | 13.9 | 12.4 | 42.7 | | 4.6 | |
| J | 15.2 | 13.7 | | 28.9 | 4.0 | | |
| | 14.3 | 14.2 | 14.7 | 43.2 | | 3.9 | |
| | 14.2 | 14.0 | | 28.2 | 4.3 | | |
| | 16.1 | 13.8 | 14.2 | 44.1 | | 3.5 | |
| K | 13.4 | 11.8 | 12.5 | 37.7 | 6.6 | | |
| | 14.4 | 12.5 | 12.9 | 39.8 | | 7.0 | |
| L | 17.1 | 12.6 | | 29.7 | 12.1 | | |
| | 17.1 | 12.2 | | 29.3 | | 10.1 | |
| | 16.4 | 12.9 | 10.7 | 40.0 | | 8.5 | |
| M | 16.2 | 13.3 | | 29.5 | 10.9 | | |
| | 15.0 | 12.4 | 13.3 | 40.7 | | 8.6 | |
| | 14.4 | 12.7 | | 27.1 | 12.1 | | |
| | 15.5 | 12.4 | 12.6 | 40.5 | | 8.9 | |
| N | 10.9 | 11.7 | 10.5 | 33.1 | 9.0 | | |
| | 14.8 | 15.9 | 14.5 | 45.2 | | 6.8 | |
| | 12.3 | 12.0 | 8.0 | 32.3 | 6.9 | | |
| | 15.7 | 16.5 | 12.4 | 44.6 | | 6.0 | |
| O | 17.8 | 17.7 | | 35.5 | 7.0 | | |
| | 11.4 | 17.8 | 17.7 | 46.9 | 7.1 | | |
| | 17.7 | 17.7 | | 35.4 | | 5.5 | |
| | 16.5 | 16.4 | 16.4 | 49.3 | | 5.4 | |
| Commercial-A.[3] | 13.6 | 14.8 | | 28.4 | 9.6 | | |
| | 14.6 | 14.2 | | 28.8 | | 13.5 | |
| | 14.6 | 13.9 | | 28.5 | | | [4] 15.0 |
| Commercial-B.[5] | 16.3 | 13.0 | | 29.3 | 6.2 | | |
| | 16.7 | 13.3 | | 30.0 | | 21.8 | |
| Commercial-C.[5] | 12.2 | 12.4 | | 24.6 | 3.9 | | |
| | 12.4 | 12.6 | | 25.0 | | 20.5 | |
| Commercial-D.[6] | 18.1 | 14.7 | | 32.8 | 19.0 | | |
| | 18.1 | 15.2 | | 33.3 | | 18.3 | |
| | 17.2 | 14.9 | 14.7 | 46.8 | 14.8 | | |
| | 18.3 | 14.0 | 14.3 | 46.6 | | 13.9 | |
| Commercial-D-1.[7] | 19.8 | 13.7 | | 33.5 | 17.2 | | |
| | 17.7 | 13.8 | | 31.5 | | 17.1 | |
| | 19.3 | 14.0 | 12.6 | 45.9 | 16.5 | | |
| | 18.8 | 13.9 | 11.6 | 44.3 | | 17.0 | |
| Commercial-E.[6] | 22.7 | 20.9 | | 43.6 | 12.8 | | |
| | 24.0 | 19.6 | | 43.6 | | 17.0 | |
| | 23.3 | 21.0 | 18.4 | 62.7 | 16.2 | | |
| | 22.2 | 20.3 | 19.9 | 62.4 | | 14.1 | |
| Commercial-E-1.[7] | 22.1 | 16.8 | | 38.9 | 16.8 | | |
| | 21.2 | 16.8 | | 38.0 | | 15.7 | |
| | 22.1 | 16.3 | 14.9 | 53.3 | 12.8 | | |
| | 21.6 | 15.7 | 14.3 | 51.6 | | 14.4 | |

*Details of experimental procedure are given in Federal Specification TT-P-34a. These are average results of duplicates or triplicates.
[1] The test specimens were exposed to natural weathering at 45° facing South for about five months at New Orleans, Louisiana.
[2] A weather-resistant color-stable paint formulation. See paint formulation H.
[3] A commercial, exterior, intumescing, fire-retardant paint formulation.
[4] The test specimen began cracking after several months exposure.
[5] A commercial, interior, intumescing, fire-retardant paint formulation.
[6] A commercial, exterior paint formulation.
[7] A commercial, exterior paint formulation plus 18% of the water-resistant carbonific polyurethane incorporated in our intumescing, fire-retardant paint formulations. A comparable amount of the appropriate vehicle was added to prevent changes in the pigment volume concentration.

TABLE III

[Evaluation of one-, two- and three-coat point films, prepared from single-paint formulations, for their fire treardancy in tunnel furnaces]

| Formulations | Paint on panel (gms.) | | | | Fire-retardant performance [1] | | | | |
|---|---|---|---|---|---|---|---|---|---|
| | Coats | | | Total | UL tunnel furnace | | | UL and SU tunnel furnaces Observations | |
| | 1st | 2nd | 3rd | | Flame-spread | Fuel contributed | Smoke-developed | Blistering and rupturing | Carbonaceous buildup |
| I | 12.3 | 12.3 | | 24.6 | | | | Slight | Negligible. |
| | 19.6 | 15.3 | | 34.0 | | | | do | Slight. |
| | 12.3 | 12.3 | 12.3 | 36.9 | | | | do | Do. |
| | 19.6 | 15.2 | 15.2 | 50.0 | | | | Moderate | Slight. |
| J | 20.9 | | | 20.9 | | | | Slight | Do. |
| | 18.9 | | | 18.9 | | | | do | Do. |
| | 18.0 | 16.1 | | 34.1 | | | | Excessive | Localized. |
| | 21.6 | 16.5 | | 38.1 | | | | do | Do. |
| | 9.9 | 12.2 | 14.1 | 36.2 | | | | do | Do. |
| | 13.2 | 13.5 | 9.2 | 35.9 | | | | do | Do. |
| | 26.1 | | | 26.1 | 87 | 27 | 260 | Moderate | Do. |
| | 26.0 | | | 26.0 | 85 | 33 | 410 | do | Do. |
| | 27.1 | 6.2 | | 33.3 | 82 | 51 | 519 | Excessive | Do. |
| | 27.2 | 6.1 | | 33.3 | 87 | 42 | 534 | do | Do. |
| | 28.3 | 15.2 | | 43.5 | 79 | 36 | 651 | do | Do. |
| | 28.3 | 15.4 | | 43.7 | 81 | 42 | 891 | do | Do. |
| K | 19.6 | 13.1 | | 32.7 | | | | Slight | Negligible. |
| | 18.5 | 10.9 | 13.1 | 42.5 | | | | do | Do. |
| L | 21.8 | 15.3 | | 37.1 | | | | do | Slight. |
| | 21.8 | 15.3 | 17.4 | 54.5 | | | | Moderate | Do. |
| M | 18.4 | 16.0 | | 34.4 | | | | Slight | Do. |
| | 15.2 | 15.2 | | 30.4 | | | | do | Do. |
| | 18.4 | 16.0 | 12.8 | 47.2 | | | | do | Do. |
| | 15.2 | 15.2 | 15.2 | 45.6 | | | | do | Do. |
| | 12.8 | 8.8 | | 21.6 | 54 | 31 | 170 | Negligible | Do. |
| | 12.1 | 10.1 | | 22.2 | 56 | 32 | 251 | do | Do. |
| | 11.5 | 14.9 | 12.8 | 39.2 | 46 | 22 | 316 | Localized | Do. |
| | 10.8 | 12.1 | 13.5 | 36.4 | 45 | 25 | 311 | do | Do. |

See footnotes at end of table.

TABLE III—Continued

| Formulations | Paint on panel (gms). Coats | | | | Fire-retardant performance [1] | | | | |
|---|---|---|---|---|---|---|---|---|---|
| | | | | Total | UL tunnel furnace | | | UL and SU tunnel furnaces Observations | |
| | 1st | 2nd | 3rd | | Flame-spread | Fuel contributed | Smoke-developed | Blistering and rupturing | Carbonaceous buildup |
| N | 12.9 | 15.8 | | 28.7 | | | | Negligible | Moderate. |
| | 12.9 | 10.5 | 10.0 | 33.4 | | | | do | Do. |
| | 13.3 | 10.0 | 12.9 | 36.2 | | | | Localized | Do. |
| | 13.7 | 14.6 | 16.4 | 44.7 | | | | do | Do. |
| | 18.7 | 13.5 | | 32.2 | 41 | 22 | 213 | Negligible | Do. |
| | 18.4 | 13.9 | | 32.3 | 41 | 22 | 204 | do | Do. |
| | 17.3 | 13.9 | 13.6 | 44.8 | 39 | 18 | 250 | Localized | Do. |
| | 16.1 | 13.6 | 13.5 | 43.5 | 41 | 14 | 273 | do | Do. |
| O | 16.0 | 12.8 | | 28.8 | | | | Negligible | Slight. |
| | 14.4 | 13.2 | 14.4 | 42.0 | | | | Localized | Moderate. |

[1] The UL tunnel furnace is the Underwriters' Laboratories 25-foot tunnel furnace which is described in ASTM E 84–61. The SU tunnel furnace is an elementary 8-foot tunnel furnace which was designed to simulate some of the conditions observed in the UL 25-foot tunnel furnace, and it is used to screen paint films prior to final evaluation in the UL tunnel furnace. The flame produced in the SU tunnel furnace is comparable to the flame produced in the UL tunnel furnace. The complete evaluation period employed in both tunnel furnaces is ten minutes.

The SU-8-foot tunnel furnace is not equipped to measure flame-spread, fuel-contributed and smoke-developed values, but the fire-retardant performance of paint films, such as blistering and rupturing, adherence or nonadherence between coats of paint or substrate, and presence or absence of fine cellular carbonaceous buildup can be observed very effectively in the SU 8-foot tunnel furnace. Consequently, the paint films evaluated in the SU tunnel furnace are those which do not illustrate flame-spread, fuel-contributed, and smoke-developed values. The dry paint on the panels is expressed in gms./sq. ft.

Having thus set forth our invention we claim:

1. A water-resistant carbonific material prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl) ethane, tris(hydroxymethyl) aminomethane, glycerol, erythritol, xylitol, sorbitol, mannitol, and commercial tris(hydroxymethyl) melamine, about from one to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyanate, chlorophenyl isocyanate, dichlorophenyl isocyanate, and bromophenyl isocyanate, the moles of isocyanate and the moles of polyhydric alcohol being so selected that the ratio of isocyanate groups to hydroxyl groups ranges from 0.33 to 0.875.

2. The water-resistant carbonific material of claim 1, wherein the polyhydric alcohol is pentaerythritol.

3. The water-resistant carbonific material of claim 1, wherein the polyhydric alcohol is dipentaerythritol.

4. The water-resistant carbonific material of claim 1, wherein the polyhydric alcohol is tripentaerythritol.

5. The water-resistant carbonific material of claim 1, wherein the polyhydric alcohol is tris(hydroxymethyl) ethane.

6. The water-resistant carbonific material of claim 1, wherein the polyhydric alcohol is tris(hydroxymethyl) aminomethane.

7. The water-resistant carbonific material of claim 1, wherein the polyhydric alcohol is glycerol.

8. The water-resistant carbonific material of claim 1, wherein the polyhydric alcohol is erythritol.

9. The water-resistant carbonific material of claim 1, wherein the polyhydric alcohol is xylitol.

10. The water-resistant carbonific material of claim 1, wherein the polyhydric alcohol is sorbitol.

11. The water-resistant carbonific material of claim 1, wherein the polyhydric alcohol is mannitol.

12. The water-resistant carbonific material of claim 1, wherein the polyhydric alcohol is commercial tris(hydroxymethyl)melamine.

13. A weather-resistant intumescing, fire-retardant coating composition prepared by milling about from 25 to 33 weight percent of an oil modified alkyd vehicle of the following approximate composition: 100 to 150 parts of drying oils with conjugated unsaturation, 100 to 150 parts of drying oil fatty acids essentially devoid of conjugated unsaturation, 35 parts of trimethylolethane, 43 parts of chlorendic (1,4,5,6,7,7 - hexachlorobicyclo-(2,2,1)-5-heptene-2,3-dicarboxylic) acid and 19 parts of tolylene diisocyanate; with about from 10 to 30 weight percent of the water-resistant carbonific material of claim 2; about six weight percent of 70% chlorinated paraffin; about five weight percent of the polyamide of dimerized linoleic acid and ethylenediamine; and with about from 15 to 40 weight percent of a pigment composition of the following approximate composition: about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

14. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 3.

15. A weather-resistant intumescing, fire-retardant coating composition comprising the vehicle, pigments, chlorinated paraffin, and polyamide of claim 13 but modified by incorporating about from 10 to 30 weight percent of the water-resistant, carbonific material of claim 4.

16. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 5.

17. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 6.

18. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 7.

19. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 8.

20. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 9.

21. A weather-resistant intumescing, fire-retardant coating composition comprising the vehicle, pigments, chlorinated paraffin, and polyamide of claim 13 but modified by incorporating about from 10 to 30 weight percent of the water-resistant carbonific material of claim 10.

22. A weather-resistant intumescing, fire-retardant coating composition comprising the vehicle, pigments, 23. A weather-resistant intumescing fire-retardant coating composition comprising the vehicle, pigments, chlorinated paraffin, and polyamide of claim 13 but modified by incorporating about from 10 to 30 weight percent of the water-resistant carbonific material of claim 11.

23. A weather-resistant intumescing fire-retardant coating composition comprising the vehicle, pigments, chlorinated paraffin, and polyamide of claim 13 but modified by incorporating about from 10 to 30 weight percent of the water-resistant carbonific material of claim 12.

24. A water-resistant, spumific, fire-retardant material prepared by reacting, in aqueous solution, about from one to two moles of a polyaminotriazine selected from the group consisting of 2,4,6-triaminotriazine and 2,4-diamino-6-phenyltriazine with about from one to two moles of a phosphorus-containing compound selected from the group consisting of phosphoric acid, chloromethylphosphonic acid, phenylphosphonic acid, butyl acid phosphate, and mixtures thereof, removing the water from the reaction mixture by evaporation, and heating the dried reaction mixture at a temperature of about from 205° C. to 220° C. for at least five hours.

25. A water-resistant intumescing, fire-retardant material prepared by mixing about from 20 to 80 weight percent of a water-resistant spumific, fire-retardant material prepared by heating, at temperatures about from 100 to 220° C. about from one to two moles of a polyaminotriazine selected from the group consisting of 2,4,6-triaminotriazine and 2,4-diamino-6-phenyltriazine with about from one to two moles of a phosphorous-containing compound selected from the group consisting of phosphoric acid, chloromethylphosphonic acid, phenylphosphonic acid and butyl acid phosphate and mixture thereof with about from 20 to 80 weight percent of a water-resistant carbonific material prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine, about from one to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyanate, chlorophenyl isocyanate, dichlorophenyl isocyanate, and bromophenyl isocyanate.

26. A weather-resistant intumescing fire-retardant coating composition prepared by milling about from 25 to 33 weight percent of an oil modified alkyld vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic (1,4,5,6,7,7-hexachlorobicyclo-(2.2.1)-5 - heptene-2,3-dicarboxylic) acid, and 19 parts of tolylenediisocyanate, with about from 10 to 40 weight percent of a water-resistant intumescing, fire-retardant material of claim 25, with about six weight percent of 70% chlorinated paraffin, with about five weight percent of the polyamide of dimerized linoleic acid and ethylenediamine, and with about from 15 to 40 weight percent of a pigment composition of the following approximate composition: about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

27. A water-resistant, intumescing, fire-retardant material prepared by mixing about from 20 to 80 weight percent of a polyhaloalkyl phosphorus compound selected from the group consisting of tris(2,3-dibromopropyl) phosphate, tris(2,3-dichloropropyl) phosphate, tris(2-chloroethyl) phosphate, tris (1-chloro-3-bromoisopropyl) phosphate and bis(1-chloro-3-bromoisopropyl)1-chloro-3-bromoisopropylphosphonate, with about from two to 50 weight percent of polyaminotriazine with about from 20 to 80 weight percent of a water-resistant carbonific material prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine, about from one to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyanate, chlorophenyl isocyanate, dichlorophenyl isocyanate, and bromophenyl isocyanate.

28. A weather-resistant intumescing, fire-retardant coating composition prepared by milling about from 25 to 33 weight percent of an oil modified alkyd vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic 1,4,5,6,7,7-hexachlorobicyclo-(2.2.1) - 5 - heptene-2,3,-dicarboxylic) acid and 19 parts of tolylene diisocyanate; with about from 10 to 40 weight percent of a water-resistant intumescing, fire-retardant material prepared by mixing about from 20 to 80 weight percent of a polyhaloalkyl phosphorus compound selected from the group consisting of tris(2,3-dibromopropyl) phosphate, tris(2,3-dichloropropyl) phosphate, tris(2-chloroethyl) phosphate, tris(1-chloro-3-bromoisopropyl) phosphate and bis(1-chloro-3-bromoisopropyl)1-chloro - 3 - bromoisopropylphosphonate, with about from 20 to 80 weight percent of a water-resistant carbonific material prepared by reacting at room temperature to about 180° C. in the presence of catalytic amounts of tertiary amine, about from one to three moles of a poyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine, about from 0 to 2 moles of a polyisocyanate selected from the group consisting of tolylene diisocyanate, trichlorophenyl diisocyanate, biphenylene diisocyanate, and hexamethylene diisocyanate and about 0 to 10 moles of a monoisocyanate selected from the group consisting of phenyl isocyanate, chlorophenyl isocyanate, dichlorophenyl isocyanate and bromophenyl isocyanate, with about from 0 to 50 weight percent of 2,4,6-triaminotriazine; with about six weight percent of 70% chlorinated paraffin; with about five weight percent of the polyamide of dimerized linoleic acid and ethylenediamine; and with about from 15 to 40 weight percent of a pigment composition made from about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

29. A water-resistant intumescing, fire-resistant material prepared by mixing about from 20 to 80 weight percent of a water-resistant carbonific material prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl)ethane, tris (hydroxymethyl)aminomethane, glycerol, erythritol, xylitol, sorbitol, mannitol, and commercial tris(hydroxymethyl)melamine, about from one to two moles of a polyisocyanate selected from the group consisting of tolylene diisocyanate, trichlorophenyl diisocyanate, biphenylene diisocyanate, and hexamethylene diisocyanate, and about from 0 to 10 moles of a monoisocyanate selected from the group consisting of phenyl isocyanate, chlorophenyl isocyanate, dichlorophenyl isocyanate, and bromophenyl isocyanate, with about from 10 to 50 weight percent of a water-resistant spumific fire-retardant material prepared by heating, at temperatures of about from 100 to 220° C., about from one to two moles of polyaminotriazine selected from the group consisting of 2,4,6-triaminotriazine and 2,4-diamino-6-phenyltriazine with about from one to two moles of a phosphorus-containing compound selected from the group consisting of phosphoric acid, chloromethylphosphonic acid, phenylphosphonic acid and butyl acid phosphate and mixtures thereof, with about from 10 to 50 weight percent of a polyhaloalkyl phosphorus compound selected from the group consisting of tris(2,3-dibromopropyl)phosphate, tris(2,3 - dichloropropyl)phosphate, tris(2-chloroethyl) phosphate, tris(1-chloro-3-bromoisopropyl)phosphate, and bis(1-chloro-3-bromoisopropyl) 1-chloro-3-bromoisopropylphosphonate.

30. A weather-resistant intumescing, fire-retardant coating composition prepared by milling about from 25 to 33 weight percent of an oil modified alkyd vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic (1,4,5,6,7,7-hexachlorobicyclo-(2.2.1)-5-heptene-2,3-dicarboxylic) acid, and 19 parts of tolylene diisocyanate; with about from 10 to 40 weight percent of a water-resistant intumescing, fire-retardant material of claim 29; with about six weight percent of 70% chlorinated paraffin, with about five weight percent of the polyamide of dimerized linoleic acid and ethylenediamine; and with about from 15 to 40 weight percent of a pigment composition made from about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

31. A water-resistant carbonific material prepared by heating at temperatures about from 80 to 120° C. about from one to two moles of a polyhydric alcohol selected from the group consisting of pentaerythritol, dipentaerythritol, and tripentaerythritol with about from one to four moles of a glycol bis(chloroformate) selected from the group consisting of ethylene glycol bis(chloroformate) and diethylene glycol bis(chloroformate), and with about from one to five moles of an alkyl chloroformate selected from the group consisting of ethyl chloroformate, propyl chloroformate, isopropyl chloroformate, butyl chloroformate, isobutyl chloroformate, and pentyl chloroformate.

32. A water-resistant intumescing, fire-retardant material prepared by mixing about from 20 to 80 weight percent of a water-resistant carbonific material of claim 31 with about from 20 to 80 weight percent of a water-resistant spumific, fire-retardant material prepared by heating, at temperatures about from 100 to 220° C., about from one to two moles of polyaminotriazine selected from the group consisting of 2,4,6-triaminotriazine and 2,4-diamino-6-phenyltriazine with about from one to two moles of a phosphorus-containing compound selected from the group consisting of phosphoric acid, chloromethylophosphonic acid, phenylphosphonic acid and butyl acid phosphate and mixtures thereof.

33. A weather-resistant intumescing, fire-retradant coating composition prepared by milling about from 25 to 33 weight percent of an oil-modified alkyd vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic (1,4,5,6,7,7-hexachlorobicyclo-(2.2.1)-5-heptene-2,3-dicarboxylic) acid, and 19 parts of tolylene diisocyanate, with about from 10 to 40 percent of a water-resistant intumescing, fire-retardant material of claim 32, with about six weight percent of 70% chlorinated paraffin, with about five weight percent of the polyamide of dimerized linoleic acid and ethylenediamine, and with about from 15 to 40 weight percent of a pigment composition of the following approximate composition: about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

34. A water-resistant intumescing, fire-retardant material prepared by heating at temperatures about from room temperature to 180° C. in the presence of a tertiary amine catalyst about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl)melamine, with about from one to two moles of a polyaminotriazine selected from the group consisting of 2,4,6-triaminotriazine and 2,4-diamino-6-phenyltriazine, with about from one to three moles of a dialkyl dihydroxylalkyl phosphorus compound selected from the group consisting of a dialkyl dihydroxyalkyl phosphate, dialkyl dialkylolaminoalkylphosphonate, dialkyl dihydroxyalkylphosphonate, and dialkyl dihydroxychloroalkylphosphonate, with about from one to six moles of a polyisocyanate selected from the group consisting of tolyene diisocyanate, trichlorophenyl diisocyanate, biphenylene diisocyanate, and hexamethylene diisocyanate, and with about from two to 10 moles of a monoisocyanate selected from the group consisting of phenyl isocyanate, chlorophenyl isocyanate, dichlorophenyl isocyanate, and bromophenyl isocyanate.

35. A water-resistant intumescing fire-retardant material prepared by mixing about from 20 to 80 weight percent of a water-resistant intumescing, fire-retardant phosphorus polyurethane of claim 34 with about from 20 to 80 weight percent of a polyhalolakyl phosphorus compound selected from the group consisting of tris (2,3-dibromopropyl) phosphate, tris(2,3-dichloropropyl) phosphate, tris(2-chloroethyl) phosphate, tris(1-chloro-3-bromoisopropyl) phosphate and bis(1-chloro-3-bromoisopropyl) 1-chloro-3-bromoisopropylphosphonate.

36. A weather-resistant intumescing, fire-retardant coating composition prepared by milling about from 25 to 33 weight percent of an oil modified alkyd vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic (1,4,5,6,7,7 - hexachlorobicyclo - (2.2.1) - 5-heptene-2,3-dicarboxylic) acid, and 19 parts of tolylene diisocyanate, with about from 10 to 40 weight percent of a water-resistant intumescing, fire-retardant material of claim 35, with about six weight percent of 70% chlorinated paraffin, about five weight percent of the polyamide of dimerized linoleic acid and ethylenediamine, and with about from 15 to 40 weight percent of a pigment composition of the following approximate composition: about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

37. A water-resistant, intumescing, fire-retardant material prepared by heating at temperatures about from room temperature to 150° C. about from one to three moles of a polyhydric alcohol selected from the group consisting of pentaerythritol, dipentaerythritol and tripentaerythritol, with about from one to three moles of an alkyl phosphorus halide selected from the group consisting of ethyl phosphorodichloridate, phenylphosphonodichloridate and chloromethylphosphonodichloridate with about from 0 to six moles of a dialkyl phosphorodichloridate selected from the group consisting of diethyl phosphorochloridate and dibutyl phosphorochloridate, followed with about from one to three moles of a polyisocyanate selected from the group consisting of tolylene diisocyanate, trichlorophenyl diisocyanate, biphenylene diisocyanate and hexamethylene diisocyanate, with about from 0 to 8 moles of a monoisocyanate selected from the group consisting of phenyl isocyanate, chlorophenyl isocyanate, dichlorophenyl isocyanate and bromophenyl isocyanate.

38. A weather-resistant, intumescing, fire-retardant coating composition prepared by milling about from 25 to 33 weight percent of an oil-modified alkyd vehicle of the following approximate composition: 100 to 150 parts of drying oils with conjugated unsaturation, 100 to 50 parts of drying oil fatty acids essentially devoid of conjugated unsaturation; 35 patrs of trimethylolethane; 43 parts of chlorendic (1,4,5,6,7,7-hexachlorobicyclo-(2.2.1)-5-heptene-2,3-dicarboxylic) acid, and 19 parts of tolylene diisocyanate; with about from 5 to 30 weight percent of a water-resistant, intumescing, fire-retardant material of claim 37, with about from 0 to 20 weight percent of a water-resistant carbonific material prepared by reacting at room temperature to about 180° C. in the presence of catalytic amounts of tertiary amine; about from one to three moles of a polyhydric alcohol selected from the group consisting of pentaerythritol, dipentaerythritol, tripentaerythritol, tris(hydroxymethyl)ethane, and tris(hydroxymethyl)aminomethane; about from 0 to two moles of a polyisocyanate selected from the group consisting of tolylene diisocyanate, trichlorophenyl diisocyanate, biphenylene diisocyanate, and hexamethylene diisocyanate, and about from 0 to 10 moles of a monoisocyanate selected from the group consisting of phenyl isocyanate, chlorophenyl isocyanate, dichlorophenyl isocyanate, and bromophenyl isocyanate; with about from 5 to 15 weight percent of a polyhaloalkyl phosphorus compound selected from the group consisting of tris(2,3-dibromopropyl) phosphate, tris(2,3 - dichloropropyl) phosphate, tris(2-chloroethyl) phosphate, tris(1-chloro-3-bromoisopropyl) phosphate and bis(1-chloro-3-bromoisopropyl) 1-chloro-3-bromoisopropylphosphonate, with about six weight percent of 70% chlorinated paraffin, with about five weight percent of the polyamide of dimerized linoleic acid and ethylenediamine, and with about from 15 to 40 weight percent of a pigment composition made from about 12 parts of titanium dioxide, about 35 parts of zinc borate, about two parts of magnesium silicate, about 20 parts of lead sulfate, about 20 parts of lead carbonate, and about 11 parts of zinc oxide, and thinning the mixed components to a viscosity of about 90 Krebs units.

39. A weather-resistant, intumescing, fire-retardant coating composition prepared by milling about from 5 to 30 weight percent of an oil-modified alkyd vehicle of the following approximate composition: 100 to 150 parts of drying oils with conjugated unsaturation, 100 to 50 parts of drying oil fatty acids essentially devoid of conjugated unsaturation, 35 parts of trimethylolethane, 43 parts of chlorendic (1,4,5,6,7,7-hexachlorobicyclo-(22.2.1)-5-heptene-2,3-dicarboxylic) acid and 19 parts of tolylene diisocyanate; with about from 0 to 25 weight percent of a highly bodied drying oil such as $Z_4$–$Z_5$ viscosity air-blown tung oil; with about from 10 to 40 weight percent of a water-reistant, intumescing, fire-retardant material prepared by mixing about from 20 to 80 weight percent of a polyhaloalkyl phosphorus compound selected from the group consisting of tris(2,3-dibromopropyl) phosphate, tris(2,3-dichloropropyl) phosphate, tris(2-chloroethyl) phosphate, tris(1-chloro-3-bromoisopropyl) phosphate and bis(1-chloro-3-bromoisopropyl) 1 - chloro - 3 - bromoisopropylphosphonate with about from 20 to 80 weight percent of a water-resistant carbonific material prepared by reacting at room temperature to about 180° C. in the presence of catalytic amounts of tertiary amine, about from one to three moles of a polyhydric alcohol selected from the group consisting of pentaerythritol, dipentaerythritol, tripentaerythritol, tris(hydroxymethyl)ethane, tris(hydroxymethyl)aminomethane, glycerol, erythritol, xylitol, sorbitol, mannitol, and commercial tris(hydroxymethyl) melamine, about from 0 to two moles of a polyisocyanate selected from the group consisting of tolylene diisocyanate, trichlorophenyl diisocyanate, biphenylene diisocyanate, and hexamethylene diisocyanate and about from 0 to 10 moles of a monoisocyanate selected from the group consisting of phenyl isocyanate, chlorophenyl isocyanate, dichlorophenyl isocyanate, and bromophenyl isocyanate; with about from 0 to 15 weight percent of a water-resistant spumific fire-retardant material prepared by heating at temperatures of about from 100 to 220° C. about from one to two moles of a polyaminotriazine selected from the group consisting of 2,4,6-triaminotriazine and 2,4-diamino-6-phenyltriazine, and about from one to two moles of a phosphorus-containing compound selected from the group consisting of phosphoric acid, chloromethylphosphonic acid, phenylphosphonic acid and butyl acid phosphate and mixtures thereof with about six weight percent of 70% chlorinated paraffin; with about five weight percent of the polyamide of dimerized linoleic acid and ethylenediamine; and with about from 15 to 40 weight percent of a pigment composition made from about 12 parts of titanium dioxide, about 35 parts of zinc borate, about two parts of magnesium silicate, about 20 parts of lead sulfate, about 20 parts of lead carbonate, and about 11 parts of zinc oxide; and thinning the mixed components to a viscosity of about 90 Krebs units.

References Cited

UNITED STATES PATENTS

| | | | |
|---|---|---|---|
| 2,855,421 | 10/1958 | Bunge et al. | 260—77.5 |
| 3,269,989 | 8/1966 | Rayner et al. | 260—22 |

FOREIGN PATENTS

| | |
|---|---|
| 946,173 | Germany. |

OTHER REFERENCES

Chem. Abstracts, vol. 52, No. 5, Mar. 10, 1958, pp. 4202 and 4203a.

Chem. Abstracts, vol. 54, No. 4. Feb. 26, 1960, p. 3988g.

DONALD E. CZAJA, *Primary Examiner.*

R. W. GRIFFIN, *Assistant Examiner.*